United States Patent [19]
Meyer et al.

[11] Patent Number: 5,315,882
[45] Date of Patent: May 31, 1994

[54] SIX AXIS LOAD CELL

[75] Inventors: Richard A. Meyer, Carver; Douglas J. Olson, Plymouth, both of Minn.

[73] Assignee: MTS Systems Corporation, Eden Prairie, Minn.

[21] Appl. No.: 856,118

[22] Filed: Mar. 23, 1992

[51] Int. Cl.⁵ .............................................. G01L 1/00
[52] U.S. Cl. ............................ 73/862.044; 73/862.042
[58] Field of Search ...................... 73/862.041-862.045

[56] References Cited

U.S. PATENT DOCUMENTS

| | | | |
|---|---|---|---|
| 3,618,376 | 11/1971 | Schull et al. | 73/862.045 |
| 3,771,359 | 11/1973 | Shoberg | 73/862.044 |
| 4,483,203 | 11/1984 | Capper | 73/862.04 |
| 4,488,441 | 12/1984 | Ramming | 73/862.04 |
| 4,550,617 | 11/1985 | Fraignier et al. | 73/862.04 |
| 4,640,138 | 2/1987 | Meyer et al. | 73/862.04 |
| 4,763,531 | 8/1988 | Dieterich et al. | 73/862.044 |
| 4,821,582 | 4/1989 | Meyer et al. | 73/862.044 |
| 4,823,618 | 4/1989 | Remming | 73/862.044 |

Primary Examiner—Richard E. Chilcot, Jr.
Assistant Examiner—R. Biegel
Attorney, Agent, or Firm—Westman, Champlin & Kelly

[57] ABSTRACT

A structural assembly that measures forces along and moments about three orthogonal axes with very low cross talk or likelihood of affecting the reading in one axis from loads in another axis is disclosed. The assembly comprises a support structure having a longitudinal axis that is positioned on an axis of the plurality of orthogonal axes. The support structure is substantially compliant for moments about the longitudinal axis and substantially rigid for forces along the orthogonal axes and for moments about the non-longitudinal orthogonal axes. Structural elements of the support structure are joined together with elliptical fillets to minimize stress concentration within the structure. A torque cell that measures moments about the longitudinal axis is positioned concentrically about the longitudinal axis either within a cavity located in the support structure or cylindrically around the support structure. An upper and lower flexure diaphragm connect adjacent ends of the support structure and the torque cell. The flexure diaphragms are substantially rigid to transmit moments about the longitudinal axis from the support structure to the torque cell and substantially compliant for all forces along the orthogonal axes and moments about the non-longitudinal orthogonal axes.

17 Claims, 5 Drawing Sheets

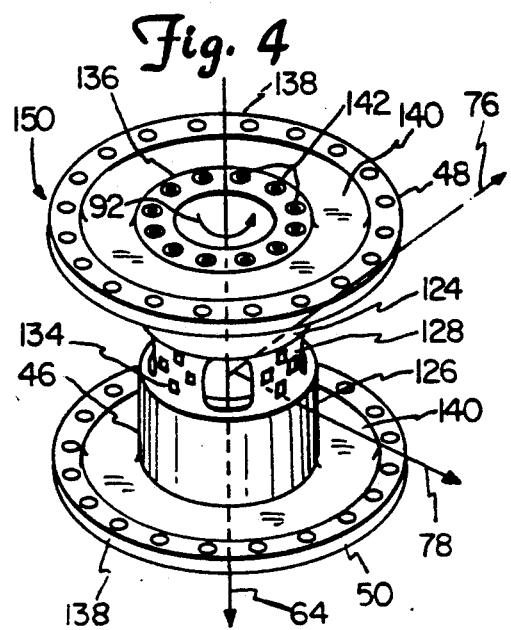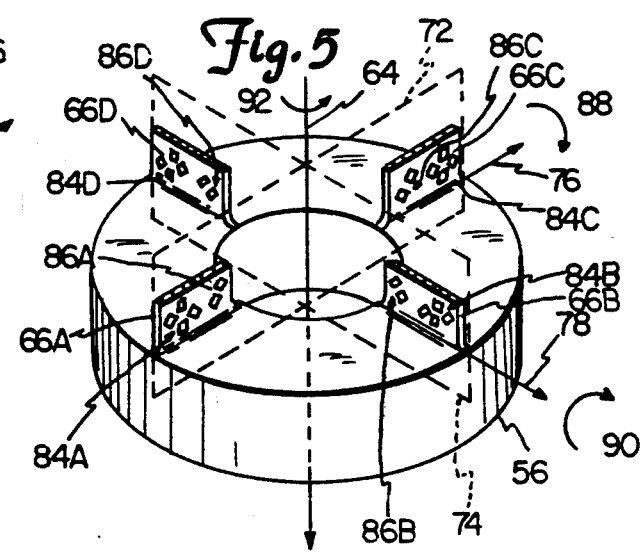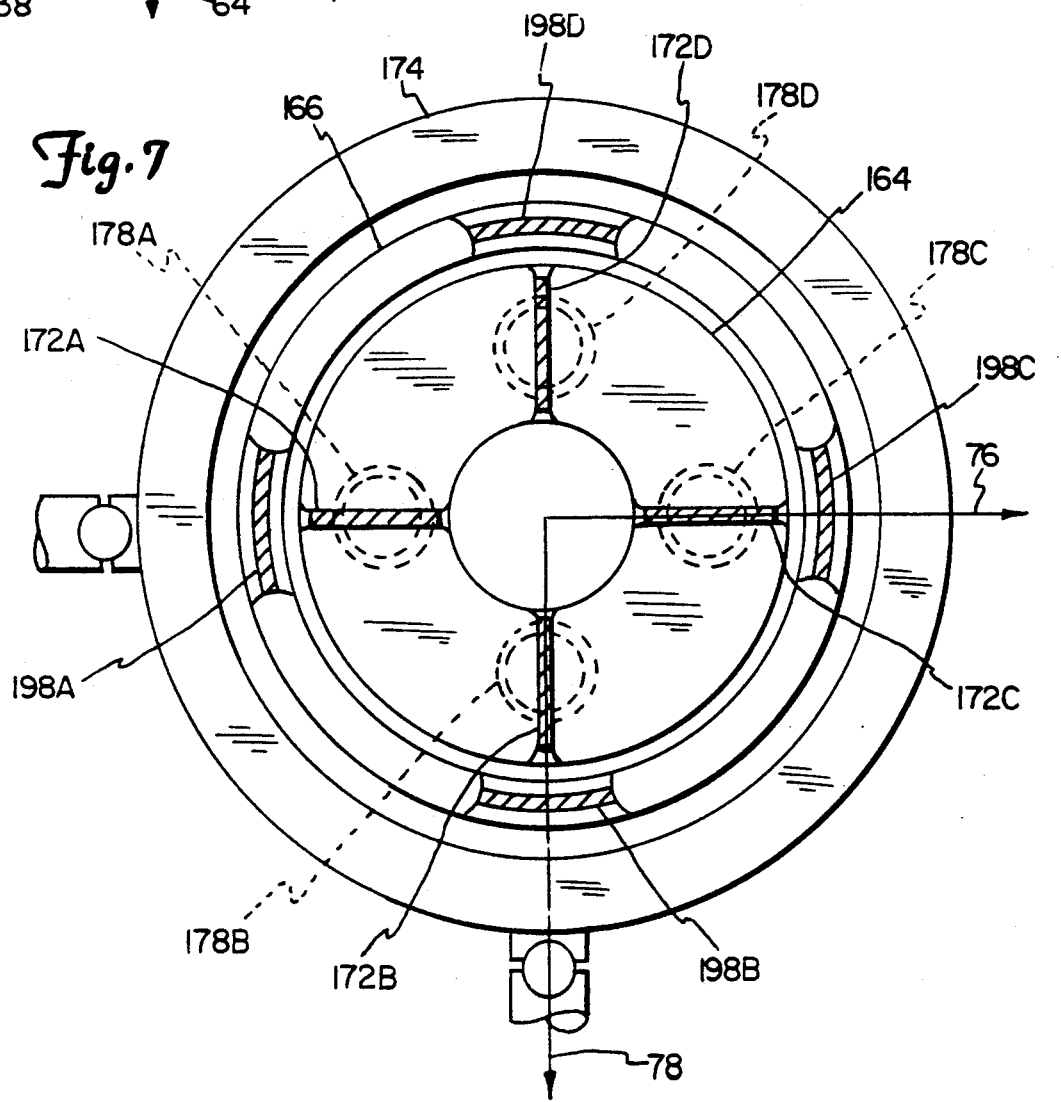

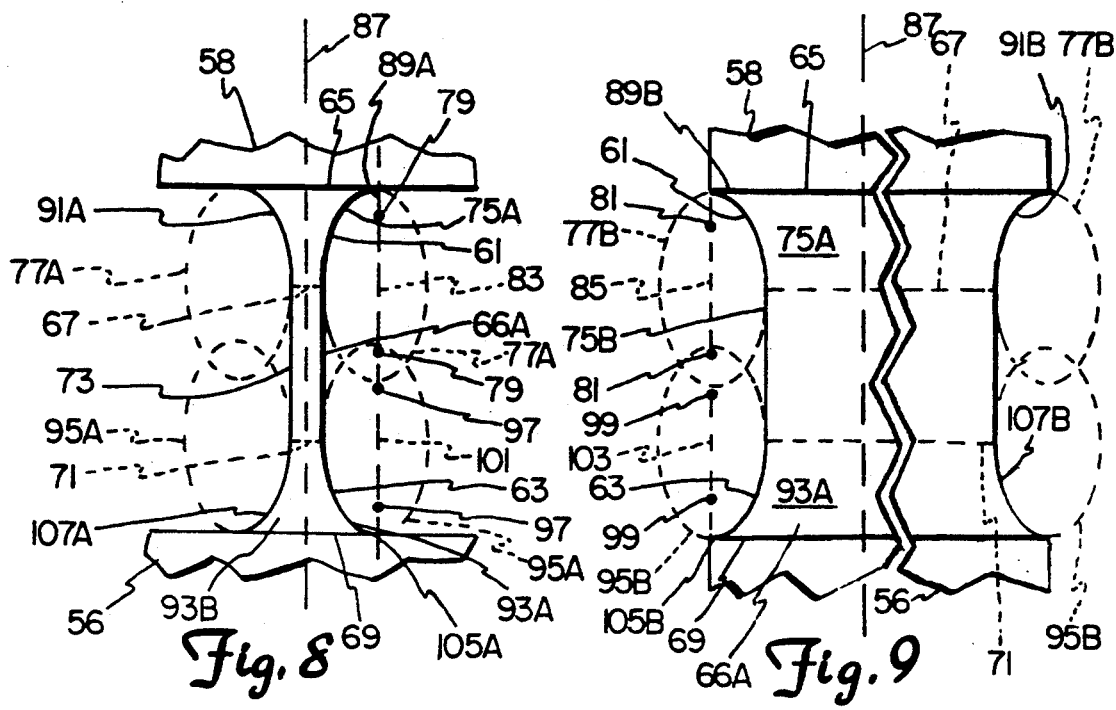
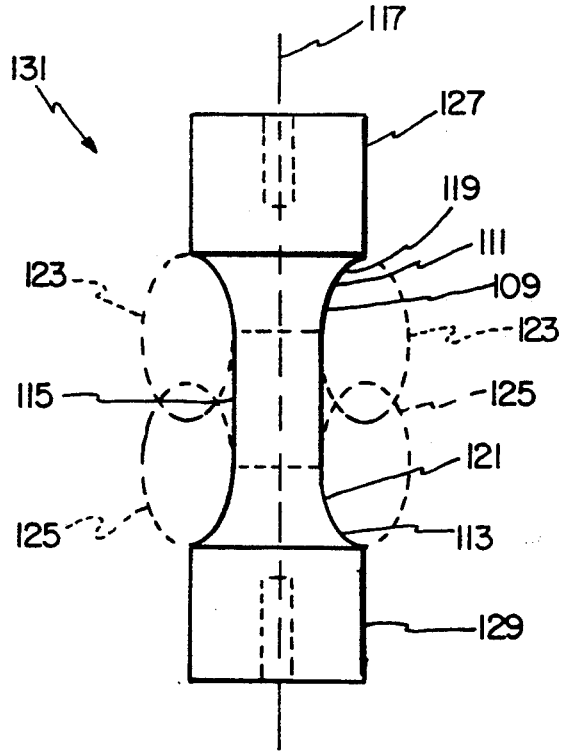

SIX AXIS LOAD CELL

BACKGROUND OF THE INVENTION

The present invention relates to a structural assembly that transmits and measures linear forces along and moments about three orthogonal axes. More particularly, a structural assembly is disclosed having structural elements connected with elliptical fillets to minimize stress concentration and interchangeable sensing elements with very low cross talk or the likelihood of affecting the reading in one axis from loads in another axis.

Transducers or load cells for determining rotational loads and axial loads about and along three orthogonal axes have been known. Two such load cells are disclosed in U.S. Pat. Nos. 4,640,138 and 4,821,582. U.S. Pat. No. 4,640,138 illustrates a multiple axis load-sensitive transducer having inner and outer members that are joined by a pair of axially spaced spiders. The spiders comprise arms that are integral with the inner member and are connected to the outer member by flexible straps that have longitudinal lengths with the ends of the straps fixed to the outer member. The arms of the spiders are fixed to the center of the associated strap. Loads are sensed as a function of bending on the spider arms.

U.S. Pat. No. 4,821,582 illustrates a load transducer that measures linear forces in three axes and moments about two of the axes. The transducer has inner and outer structures connected by load-sensitive spider arms or shear beams. The outer ends of the spider are connected to outer lengths which are stiff when the inner structure is loaded in a direction along an axis perpendicular to the plane of the spider.

SUMMARY OF THE INVENTION

The present invention relates to a structural assembly that measures forces along and moments about a plurality of orthogonal axes. The structural assembly has high force and moment isolation features such that measured values obtained for each principal axis are substantially decoupled from one another. The assembly minimizes stress concentration within the structure as well as minimizes the likelihood of forces and moments along and about one orthogonal axis from affecting values obtained for another axis even when large forces and moments are present on the other axes.

The assembly includes a support structure having a first end and a second end that define a longitudinal axis. The support structure is oriented such that the longitudinal axis is on one of the plurality of orthogonal loading axes. Manufactured preferably from a single unitary piece of material, the support structure is substantially rigid for forces along the orthogonal axes and for moments about the non-longitudinal orthogonal axes and substantially compliant for moments about the longitudinal axis. In the preferred embodiment, a plurality of support columns connect the first end of the support structure to the second end thereof. Conventional strain gages can be affixed to the support columns to measure compression and tension of the support columns in order to determine forces applied along the orthogonal axes and moments about the non-longitudinal orthogonal axes.

The support columns are each connected between a first base or loading ring at the first end and a second base or loading ring at the second end using at least partially elliptical surface fillets to minimize stress concentration. Each support column includes an upper end portion and a lower end portion coupled to the respective base or loading ring, and joined to each other to form the column. Each end portion has diverging outer surfaces on all sides extending for a selected distance along the exterior of the column and diverging and blending into a connected surface of the respective first or second base or loading rings. At least a portion of the diverging outer surfaces of each end portion is substantially elliptical when viewed in cross section or end view.

A torque cell is positioned concentrically about the support structure such that a longitudinal axis thereof is substantially parallel to the longitudinal axis to be monitored. The torque cell is connected to the support structure at opposite ends through removable flexure diaphragms having planar surfaces perpendicular to the longitudinal axis of the torque cell. Each flexure diaphragm is substantially rigid when transmitting moments about the longitudinal axis from the support structure to the torque cell, and substantially compliant to forces and moments along and about the non-longitudinal orthogonal axes and compliant to forces along the longitudinal axis.

With appropriate loading members connected to the first and second ends of the support structure, the assembly is well suited for measuring forces and moments present in vehicle suspension testing systems as well as robotic arms. Since the flexure diaphragms are removable from both the support structure and the torque cell, the support structure, the torque cell and the flexure diaphragms can be interchanged with other similar component parts having different structural capabilities and sensitivity levels. Therefore, the assembly can be optimized for each testing situation to withstand the maximum force loads along and about selected axes without sacrificing sensitivity for other axes. In addition, the removable flexure diaphragms allow the torque cell to be separated from the support structure to permit easy gaging of both elements, thus substantially reducing the time needed to gage the assembly, and therefore providing substantial cost reductions.

BRIEF DESCRIPTION OF THE DRAWINGS

FIG. 4 is a perspective view of a lower flexure diaphragm, an upper flexure diaphragm and a torque cell in the assembly of FIG. 1;

FIG. 5 is a partial perspective sectional view of the support structure;

FIG. 7 is a sectional view taken as on line 7—7 in FIG. 6;

FIG. 8 is a fragmentary side view of the support structure showing a support column of the present invention;

FIG. 9 is a fragmentary side view of the support structure showing a support column of the present invention; and FIG. 10 is a side view of a second embodiment of a support column of the present invention.

DETAILED DESCRIPTION OF THE PREFERRED EMBODIMENTS

Figure 1:
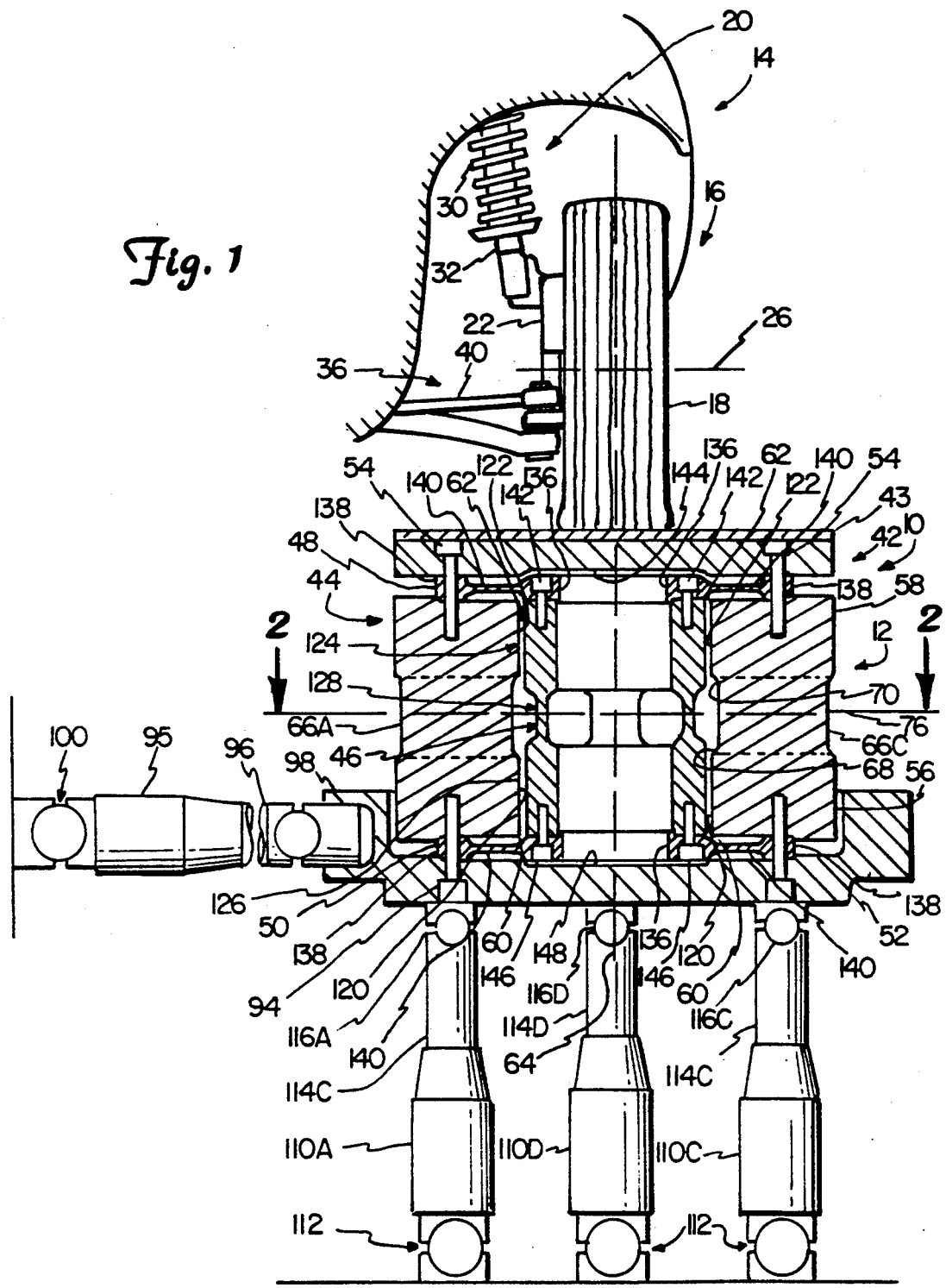
FIG. 1 is a sectional view of a force and moment transmitting assembly made according to the present invention incorporated as part of a vehicle suspension testing system.

A dynamic testing system for testing vehicle suspension road handling performance is shown generally at 10 in FIG. 1. The testing system 10 includes a force transmitting and isolating structural assembly 12 coupled to force producing actuators. The testing system 10 supports a portion of a vehicle 14 on a wheel 16 that has a pneumatic tire 18 mounted thereon. The vehicle suspension is shown schematically at 20. The vehicle suspension 20 includes a base support 22 having an axle 24 defining an axle axis 26. The wheel 16 is connected to the axle 24 on an end opposite the base support 22 such that the tire 18 has a loading axis 28 that is substantially perpendicular to the axle axis 26. A spring 30 and a shock absorber 32 are connected between the base support 22 and a portion of the vehicle frame 14 to support a portion of the vehicle weight and dampen simulated road vibrations.

Also shown schematically is a steering system 36 connected to the base support 22 and fixed to a portion of the vehicle frame 14. The steering system includes control linkages 40 for selective positioning of the wheel 16 and tire 18 about the axis 28.

The assembly 12 supports the vehicle 14 upon a wheel pan or wheel support plate 42 positioned below and in contact with the tire 18. An upper surface layer 43 in contact with the tire 18 simulates different road surfaces such as asphalt or concrete. The assembly 12 further includes a support structure 44, a torque cell 46, and flexure diaphragms 48 and 50 connecting the support structure 44 to the torque cell 46. A base member 52 also connects to the support structure 44 at the lower end. The wheel pan 42 is mounted to the top of the support structure 44 with a plurality of cap screws 54, two of which are illustrated in FIG. 1.

Figure 3:
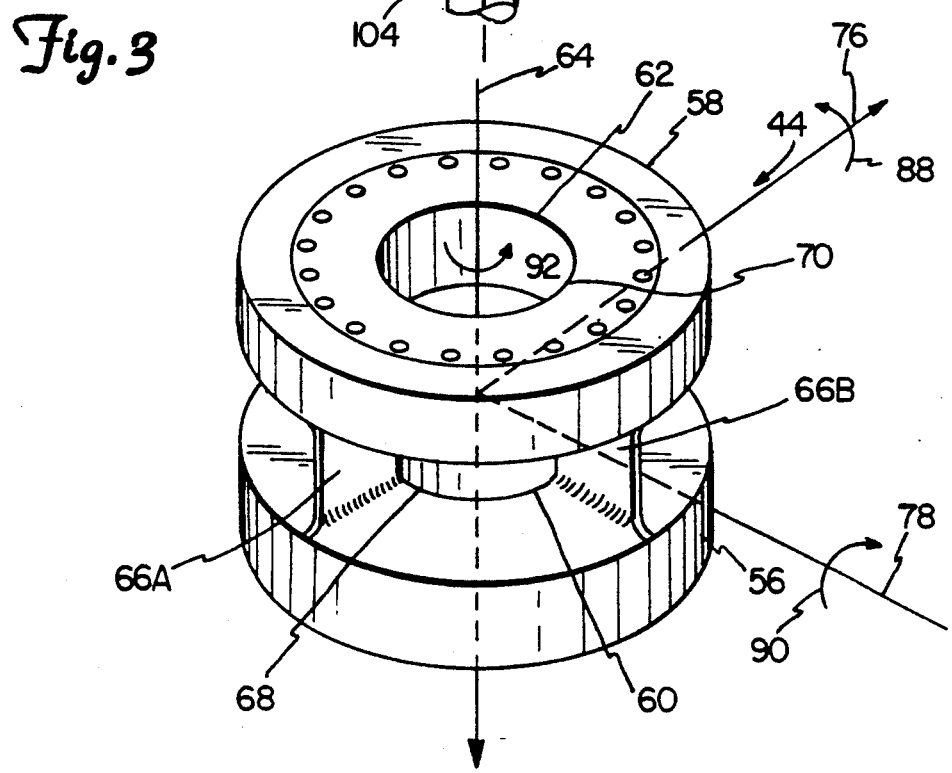
FIG. 3 is a perspective view of a support structure of the assembly.

The support structure 44 is illustrated in perspective in FIG. 3. The support structure includes a lower base portion 56 and an upper base portion 58. The lower base portion 56 and upper base portion 58 each include a central aperture 60 and 62, respectively, each centered on a longitudinal axis 64, hereinafter also denoted as the "Z" axis. As illustrated in FIG. 1, the longitudinal axis 64 is substantially parallel to the tire loading axis 28.

Referring to FIGS. 1-3 and 5, the upper base or loading ring portion 58 is connected to and spaced from the lower base or loading ring portion 56 by a plurality of support webs or columns forming flat shear beams 66A, 66B, 66C and 66D. The support columns 66A-66D are positioned at 90° angular intervals about axis 64 and extend radially out from an inner edge 68 of aperture 60 and an inner edge 70 of aperture 62. Referring to FIG. 5, support columns 66A and 66C lie on a common plane and 66B and 66D also lie on a common plane. These planes form two shear planes 72 and 74, respectively. The shear plane 72 on which the support columns 66A and 66C lie also lies along an axis 76, hereinafter also denoted as the "X" axis, that is perpendicular to the longitudinal or "Z" axis 64. Similarly, the shear plane 74 on which the support columns 66B and 66D lie, also lies along an axis 78, hereinafter also denoted as the "Y" axis, that is mutually perpendicular to both the "Z" axis 64 and the "X" axis 76. In other words, the support structure 44 is aligned with three orthogonal axes 64, 76 and 78 formed by the planes of the pairs of support columns 66A, 66C and 66B, 66D, and the longitudinal axis 64.

FIGS. 8 and 9 illustrate in detail the structure of the support columns by way of example using the support column 66A. The support column 66A includes an upper end portion 61 and a lower end portion 63. The upper end portion 61 has an outer base end 65 that joins a flat surface of upper base portion 58 and an arbitrarily selected inner end represented at dotted line 67 that is opposite the outer base end 65. Similarly, the lower end portion 63 has an outer base end 69 and an arbitrarily selected inner end represented by dotted line 71 that is opposite the outer base end 69. The outer base end 65 or upper end portion 61 joins a flat surface of upper base portion 58, while the outer base end 69 or lower end portion 63 joins a flat surface of the lower base portion 56. Although the inner ends 67 and 71 of the upper and lower end portions can be at a common junction line, in the embodiment as shown, a central column portion 73 is connected between the inner end 67 and the inner end 71 to increase the height of the support column and provide substantially flat outer surfaces upon which conventional strain gages are applied.

The upper and lower end portions 61 and 63 of the column 66A and other columns, are designed to minimize stress concentration at the respective connections or junctions to the upper base portion 58 and the lower base portion 56, respectively, through surrounding fillets that have at least partially elliptical outer surfaces when viewed in end views or cross-section. In the description to follow, elliptical curvature is used for convenience in defining the curvature of the fillet outer surfaces. Such elliptical curvature is close to the optimum curvature but not necessarily the optimum curvature needed to minimize stress concentration at the respective connections to the upper base portion 58 and the lower base portion 56. The important feature of this invention is a curvature of each outer surface that has a substantially larger radius of curvature as the outer surface blends into the support column at inner ends 67 and 71 than the radius of curvature as the outer surface meets with upper base portion 58 and lower base portion 56. Preferably, the radius of curvature decreases continuously as each outer surface approaches the upper base portion 58 and the lower base portion 56. The curvature of the outer surfaces can be obtained from modern machining techniques, using for example a programmable machining tool.

Referring to upper end portion 61, fillet outer surfaces 75A and 75B extend from the inner end line 67 to the junction of outer end 65 and the joined surface of upper base portion 58, at least a portion of each of the surfaces 75A and 75B follow part of ellipses 77A and 77B, respectively. Ellipses 77A and 77B each have corresponding foci 79 and 81 that form respective major ellipse axes 83 and 85 that are substantially parallel to a longitudinal axis 87 of the support column 66A. In the embodiment as shown, the elliptical portions of the outer surfaces 75A and 75B begin at inner end line 67 and follow the perimeter contours of ellipses 77A and 77B to selected points 89A and 89B so the outer surfaces 75A and 75B blend into the flat surface of upper base portion 58 which is joined with the outer end 65 of upper end portion 61. Points 89A and 89B are chosen to be where the amount of strain present in the upper end portion 61 for applied stress is below a desired level. In other words, the elliptical portions of outer surfaces 75A and 75B need not be tangent upon blending with the flat surface of upper base portion 58, but rather, may continue upon any desired contour once the amount of strain present is below a desired level. An outer surface 91A opposite outer surface 75A and an outer surface 91B opposite outer surface 75B have similarly elliptical outer surface fillets at the junction with upper base portion 58.

The lower end portion 63 has elliptical outer surfaces similar to the upper end portion 61. Referring to upper end portion 63, fillet outer surfaces 93A and 93B extend from the inner end line 71 to the junction of outer end 69 and the joined surface of lower base portion 56, at least a portion of each of the surfaces 93A and 93B follow part of ellipses 95A and 95B, respectively. Ellipses 95A and 95B each have corresponding foci 97 and 99 that form respective major ellipse axes 101 and 103 that are substantially parallel to the longitudinal axis 87 of the support column 66A. In the embodiment as shown, the elliptical portions of the outer surfaces 95A and 95B begin at inner end line 71 and follow the perimeter contours of ellipses 95A and 95B to selected points 105A and 105B so the outer surfaces 93A and 93B blend into the flat surface of lower base portion 54 which is joined with the outer end 69 of lower end portion 63. Points 105A and 105B are chosen to be where the amount of strain present in the lower end portion 63 for applied stress is below a desired level. In other words, the elliptical portions of outer surfaces 93A and 93B need not be tangent upon blending with the flat surface of lower base portion 56, but rather, may continue upon any desired contour once the amount of strain present is below a desired level. An outer surface 107A opposite outer surface 93A and an outer surface 107B opposite outer surface 93B have similarly elliptical outer surface fillets at the junction with lower base portion 58. Preferably, the upper end portion 61, the lower end portion 63 and the center portion 73 are formed from a single unitary block of material.

FIG. 10 illustrates a second embodiment of a support column 109. The support column 109 is concentric about a longitudinal axis 117 and includes an upper end portion 111, a lower end portion 113 and a center portion 115 located between the end portions 111 and 113. Each end portion 111 and 113 has diverging outer surfaces 119 and 121, respectively. Like the outer surfaces of end portions 61 and 63 described above, a portion of each outer surface 119 and 121 is substantially elliptical following a part of the perimeter contour of ellipses 123 and 125. As illustrated, the support column 109 can be connected between loading members 127 and 129 and conventionally gaged to form a force and moment measuring transducer or load cell 131.

Referring back to the support structure 44 illustrated in FIG. 5, the support structure 44 can use any convenient number of support columns. For example, three support webs or columns can be used each separated from the other by 120° angular intervals. Alternatively, six support columns can be used each separated from the other by 60° angular intervals. The support columns 66A–66D can be welded to the upper and lower base portions; however, preferably the support structure 44 is formed from a single block of material with no welds or other junctions that cause problems in loading or fatigue life.

The support structure 44 is substantially stiff or rigid for load or axial forces applied along the "Z" axis 64, as well as for load or shear forces applied along the "X" axis 76 and "Y" axis 78. Strain gages 84A, 84B, 84C, 84D, 86A, 86B, 86C and 86D are applied to each corresponding support column 66A–66D to measure axial and shear forces. The strain gages 84A–84D are connected in conventional Wheatstone bridges comprising two axial gages and two Poisson gages for each column. The strain gages 84A–84D provide a separate signal proportional to the axial loading applied to each support column 66A–66D whereby the total axial loading on the support structure 44 is determined from summing together each of the separate support column signals. Shear forces present in the shear plane 72 are measured with a conventional Wheatstone bridge formed from strain gages 86A and 86C, while shear forces present in the shear plane 74 are measured with a corresponding Wheatstone bridge formed from strain gages 86B and 86D. It is understood that other sensing devices such as capacitive, inductive or fiber optic based gages can be applied to the support structure using conventional known techniques to measure and determine all forces and moments.

In addition, the support structure is substantially stiff for overturning moments "$M_X$" and "$M_Y$" illustrated by arrows 88 and 90, respectively, about the "X" axis 76 and "Y" axis 78. The overturning moments "$M_X$" and "$M_Y$" are conventionally determined from compression or tension loading applied to each of the support columns 66A–66D. However, the support structure is substantially compliant for moments "$M_Z$", illustrated by arrow 92, which are moments about the longitudinal or "Z" axis 64.

Figure 2:
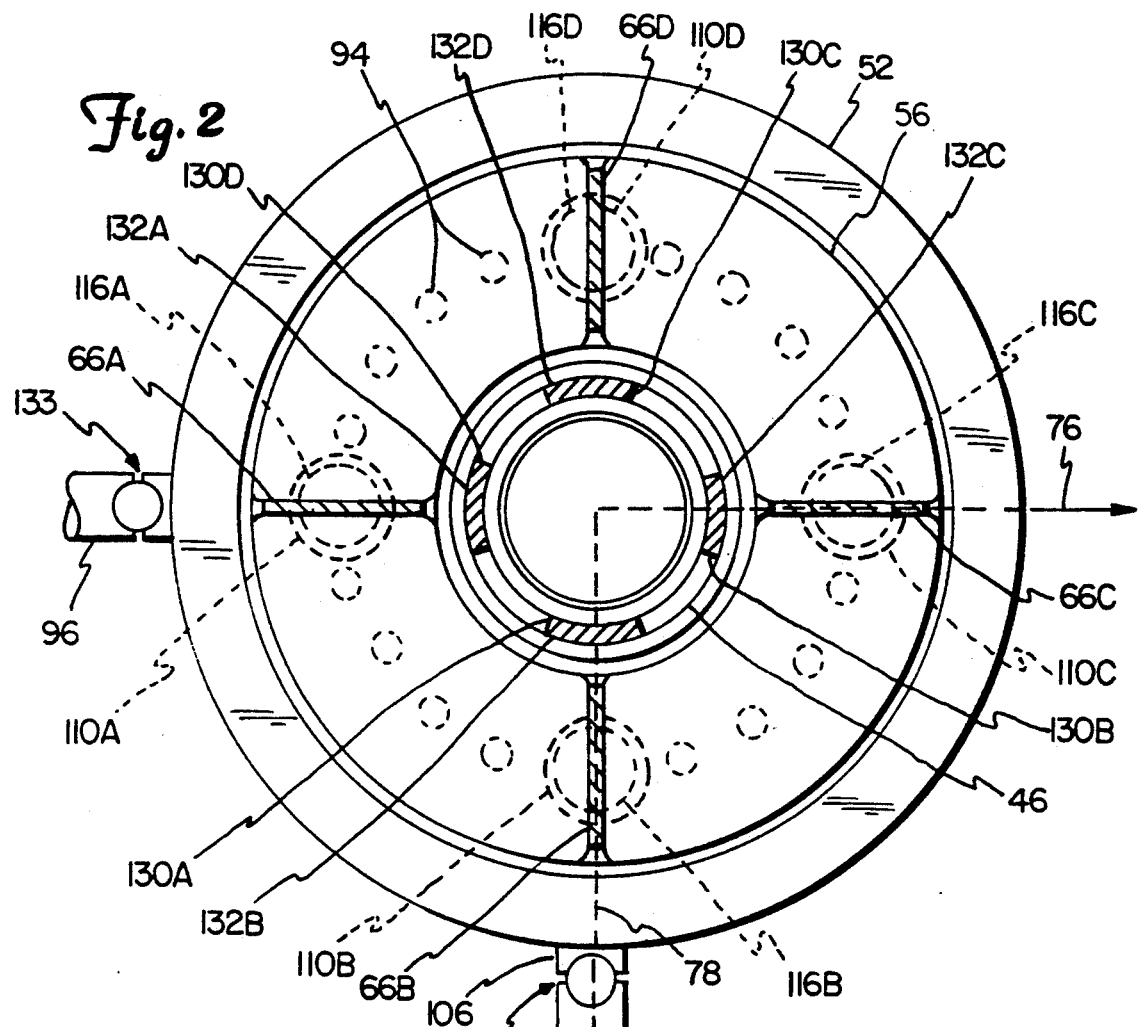
FIG. 2 is a sectional view taken as on line 2—2 in FIG. 1.

As illustrated in FIGS. 1 and 2, the base member 52 is connected to the lower base portion 56 of the support structure 44 with a plurality of concentrically positioned threaded cap screws 94. Shear forces along the "X" axis 76 are applied to the base member 52 and subsequently transferred to the vehicle suspension 20 through the support structure 44 and the wheel pan 42 from an actuator 95. The actuator 95 is connected to a drive arm 96 that is connected at an end opposite the actuator to a universal swivel joint 98. The actuator 95 is fixed to a stationary point through a suitable universal swivel joint 100. Swivel joints 100 and 98 allow for sufficient angular displacement of the assembly 12 during testing. In like fashion as, shear forces along the "Y" axis 78 are applied to the vehicle suspension 20 from an actuator, not shown, through a drive arm 104 (FIG. 2) connected to swivel joint 106.

The support structure 44 is compliant for moments about the "Z" axis in the presence of shear forces in shear planes 72 and 74. For example, when a shear force is applied along the "X" axis 76 from the lateral actuator 95, the support columns 66A and 66C each carry approximately 45% of the total applied shear force with the remaining 10% distributed approximately equally between the support columns 66B and 66D. In like fashion, when a shear force is applied along the "Y" axis 78 from the corresponding lateral actuator, the support columns 66B and 66D each carry approximately 45% of the total applied shear force with the remaining 10% distributed approximately equally between the support columns 66A and 66C.

Concentric axial loads and overturning moments about the "X" and "Y" axes are applied to the vehicle suspension 20 through the assembly 12 from actuators 110A, 110C and 110D located below the base member 52. A fourth actuator 110B below column 66B is also used but is not shown in FIG. 1. Like the shear force actuators, the axial actuators 110A-110D are secured to a stationary point through suitable universal swivel joints 112. Each actuator 110A-110D is connected to a drive arm 114A, 114B, 114C and 114D that is in turn connected to universal swivel joints 116A, 116B, 116C and 116D located below each corresponding support column 66A-66D, as shown in FIG. 2.

The support structure 44 is rigid for axial loading along the "Z" axis and overturning moments about the "X" and "Y" axes. For example, when a concentric axial load is applied by the actuators 110A-110D each exerting a force parallel to the "Z" axis 64, each of the support columns 66A-66D carry 25% of the total applied axial load. However, when an overturning moment is applied about the "X" axis 76 by unequal forces from the actuators 110B and 110D, then the moment creating forces resolved and reacted by the corresponding support columns 66B and 66D are equal and opposite. Similarly, when an overturning moment is applied about the "Y" axis 78 by unequal forces from the actuators 110A and 110C, then the moment creating forces resolved and reacted by the corresponding support columns 66A and 66C are equal and opposite. In addition, there is substantially no moment reaction about the "Z" axis 64 for small strains in the support columns 66A-66D due to moments about either the "X" axis 76 or "Y" axis 78.

Referring to FIGS. 1, 2 and 4, the torque cell 46 is concentrically aligned along the longitudinal axis 64 of the support structure 44. As illustrated, the torque cell 46 is positioned within the apertures 60 and 62 spaced apart from associated inner side walls 120 and 122, respectively. The torque cell 46 includes a first end 124, a second end 126 and a sensing section 128 that is mounted therebetween to respond to moments about the longitudinal axis 64. In the embodiment as shown, the sensing section 128 is tubular in structure with the sensing section having four apertures 130A, 130B, 130C and 130D disposed at angular intervals of 90° to define four flexure beams 132A, 132B, 132C and 132D. The flexure beams 132A-132D are supported in the torque cell 46 only at their ends, and are relatively thin in cross section. The first end 124 and the second end 126 are also tubular in structure with the cross sectional area greater than that of the flexure beams 132A-132D. With the first and second ends substantially thicker than the cross sectional area of the flexure beams 132A-132D, moments about the longitudinal axis 64 are substantially confined to the flexure beams 132A-132D. Conventional strain gages 134, shown in FIG. 4, connected in a Wheatstone bridge are applied easily to the flexure beams 132A-132D since the torque cell 46 can be removed from the support structure 44. The strain gages measure the shear forces present on the flexure beams 132A-132D and provide a signal that is proportional to the moment about the longitudinal axis 64. Alternatively, other longitudinal torque cells such as a twisting solid rod can be used.

As stated above and illustrated in FIG. 1, the torque cell 46 is positioned within the apertures 60 and 62 of the support structure 44 and aligned with the longitudinal axis 64. The torque cell 46 is connected to the support structure 44 at the first end 124 and the second end 126 with the upper base portion 58 and lower base portion 56, respectively, with the upper flexure diaphragm 48 and the lower flexure diaphragm 50. The upper and lower flexure diaphragms 48 and 50 each are formed from a unitary block of material to include an inner stiff rim portion 136 and an outer stiff rim portion 138. The inner rim portion 136 and the outer rim portion 138 are separated by and connected to each other with an axially flexible diaphragm ring or plate 140 having a cross sectional area narrower than the inner rim portion 136 or the outer rim portion 138. The upper flexure diaphragm 48 is connected to the torque cell 46 on the first end 124 with a plurality of concentrically positioned cap screws 142 projecting through the inner rim portion 136 and threaded into suitable apertures in the first end 124. The outer rim portion 138 of the upper flexure diaphragm 48 is clamped between the wheel pan 42 and the support structure 44 and secured with the concentrically positioned cap screws 54 projecting through the wheel pan 42, outer rim portion 138 and threaded into suitable apertures in the support structure 44. A lower surface portion 144 of the wheel pan above the torque cell 46 is recessed to provide an air gap sufficient for movement of the torque cell 46 during testing. In like fashion, the lower flexure diaphragm 50 is connected to the second end 126 of the torque cell 46 with a plurality of concentrically positioned cap screws 146 projecting through the inner rim portion 136 and threaded into suitable apertures in the second end 126. The outer rim portion 138 of the lower flexure diaphragm 50 is clamped between the base member 52 and the support structure 44 and secured with the concentrically positioned cap screws 94 projecting through the base member 52, outer rim portion 138 and threaded into suitable apertures in the support structure 44. An upper surface portion 148 of the base member 52 below the torque cell 46 is recessed to provide an air gap sufficient for movement of the torque cell 46.

The upper and lower flexure diaphragms 48 and 50 are substantially stiff in annular direction to transfer moments developed about the longitudinal axis or "Z" axis 64 from the support structure 44 to the torque cell 46. When the upper and lower flexure diaphragms 48 and 50 are connected to the torque cell 46 as described above and illustrated perspectively as assembly substructure 150 in FIG. 4, the assembly substructure 150 is compliant for axial loads along the "Z" axis 64 due to axial compliance of the flexible diaphragm ring or plate 140 of the diaphragms 48 and 50. In addition, the assembly substructure 150 is compliant for shear forces developed along the "X" axis 76 and the "Y" axis 78 and overturning moments about these axes due to compliance of the flexure diaphragms 48 and 50 and the axial spacing between the diaphragms.

Figure 6:
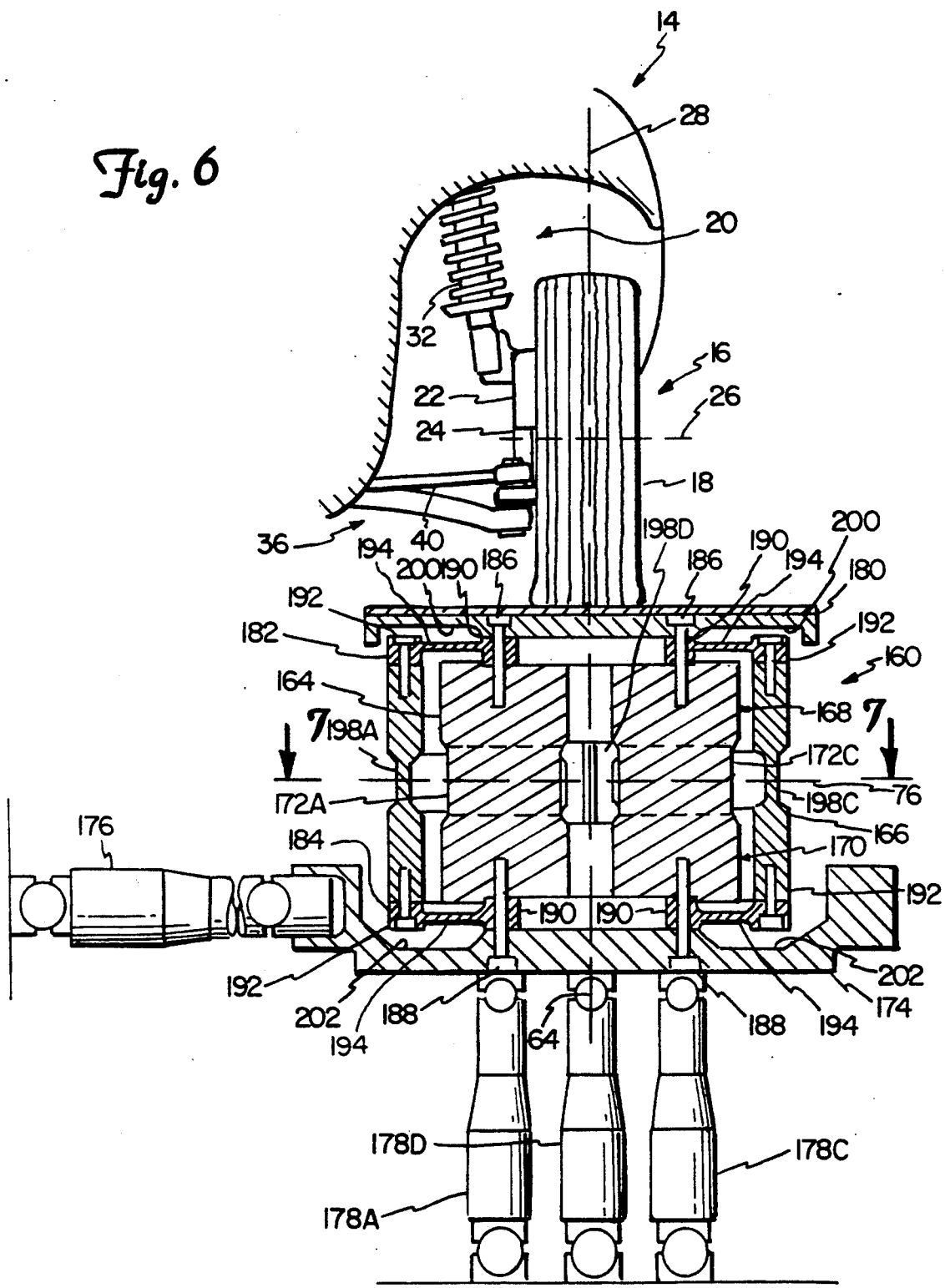
FIG. 6 is a sectional view of a second embodiment of the assembly incorporated as part of a vehicle suspension testing system.

A second embodiment of the load-sensitive assembly of the present invention is illustrated in FIGS. 6 and 7 generally as 160. In this form, a support structure 164 and a torque cell 166 have been interchanged with respect to their concentric placement about the longitudinal axis 64. As shown, the support structure 164 has a structure similar to the support structure 44 shown in FIGS. 1-3 and 5 having a first end 168 and a second end 170 that have end surfaces generally perpendicular to the longitudinal axis 64. A plurality of support columns 172A, 172B, 172C and 172D connect the first end 168 with the second end 170. The support columns 172A-172D are substantially rigid for forces along the orthogonal axes 64, 76 and 78 and for moments about the non-longitudinal orthogonal axes 76 and 78 but substantially compliant for moments about the longitudinal axis 64. Like the embodiment illustrated in FIGS. 1 and 2, shear forces along the non-longitudinal orthogonal axes 76 and 78 are applied to the support structure 164 through a base member 174 that is connected to lateral actuators such as actuator 176. Axial forces along the longitudinal axis 64 are provided from actuators 178A, 178B, 178C and 178D located below the base member 174. The forces and moments along and about the non-longitudinal orthogonal axes 76 and 78 are transferred to the first end 168 where a wheel pan 180 is mounted in a manner similar to that of the assembly 12. Compression and tension forces present within the support columns 172A–172D are measured with conventional strain gages in order to calculate the forces applied along the orthogonal axes 64, 76 and 78 and moments about the non-longitudinal orthogonal axes 76 and 78.

The torque cell 166 surrounds the support structure 164 and is attached thereto with an upper flexure diaphragm 182 and a lower flexure diaphragm 184 using concentrically positioned cap screws 186 and 188, respectively. Like the diaphragms 48 and 50, the diaphragms 182 and 184 have an inner stiff rim portion 190 and an outer stiff rim portion 192 separated by and connected with a flexible diaphragm plate 194 having a cross-sectional area narrower than the inner rim portion 190 or the outer rim portion 192. The flexure diaphragms 182 and 184 are substantially rigid to transmit moments about the longitudinal axis 64 from the support structure 144 to the torque cell 146, and substantially compliant to forces and moments along and about the non-longitudinal orthogonal axes 76 and 78 and forces along the longitudinal axis 64. Conventional strain gages, not shown, can be affixed to outer surfaces of the flexure beams 198A, 198B, 198C and 198D of the torque cell 146 to provide an output signal proportional to the applied moment. Annular grooves 200 and 202 on a lower surface of the wheel pan 180 and an upper surface of the base member 174, respectively, allow sufficient movement of the torque cell 166 and the diaphragms 182 and 184 during testing.

The embodiment illustrated in FIGS. 6 and 7 with the torque cell 166 surrounding the support structure 164 is particularly well suited when substantial moments are expected about the longitudinal axis 64. Whereas, the embodiment illustrated in FIGS. 1 and 2 having the torque cell 46 located within a longitudinal cavity of the support structure 44 is preferable when small moments about the longitudinal axis 64 are expected in the presence of either relatively large orthogonal forces or non-longitudinal overturning moments.

Although the present invention has been described with reference to preferred embodiments, workers skilled in the art will recognize that changes may be made in form and detail without departing from the spirit and scope of the invention.

What is claimed is:

1. A structural assembly having a first loading member and a second loading member, the structural assembly transmitting selected forces and moments from the first loading member to the second loading member, and isolating the selected forces and moments with respect to a plurality of orthogonal axes as strain in structural elements of the assembly, the assembly comprising:

a support structure having a first end joined to the first loading member and a second end joined to the second loading member, the first end and the second end defining a structure longitudinal axis wherein the support structure is oriented such that the structure longitudinal axis is at a known relationship to a longitudinal axis of the plurality of orthogonal axes, and having connection means connecting the first end with the second end such that the support structure is substantially rigid for forces along the orthogonal axes and for moments about the orthogonal axes other than the longitudinal orthogonal axis, and substantially compliant for moments about the longitudinal orthogonal axis;

a torque cell having a torque cell longitudinal axis concentrically positioned about the support structure such that the torque cell longitudinal axis is substantially parallel to the structure longitudinal axis, the torque cell measuring moments about the structure longitudinal axis; and flexure means connecting the support structure to the torque cell, the flexure means substantially rigid to transmit moments about the structure longitudinal axis from the support structure to the torque cell and substantially compliant to forces and moments along and about the orthogonal axes other than the moment about the longitudinal orthogonal axis.

2. The assembly of claim 1 wherein the connection means comprises a plurality of support columns.

3. The assembly of claim 2 wherein each support column is connected to the first end with an upper fillet portion and is connected to the second end with a lower fillet portion, each fillet portion having diverging outer surfaces with at least a portion of the diverging outer surfaces being substantially elliptical.

4. The assembly of claim 2 wherein the connection means comprises four support columns wherein each support column is angularly displaced from an adjacent support column by 90 degrees.

5. The assembly of claim 4 wherein each support column has a planar surface extending radially from the structure longitudinal axis.

6. The assembly of claim 1 wherein the flexure means comprises a first diaphragm member connected to the first end of the support structure and a corresponding end of the torque cell, and a second diaphragm member connected to the second end of the support structure and a corresponding end of the torque cell.

7. The assembly of claim 1 wherein the support structure includes a longitudinal cavity extending along the structure longitudinal axis, the torque cell disposed within the structure longitudinal cavity.

8. The assembly of claim 1 wherein the torque cell includes a longitudinal cavity extending along the torque cell longitudinal axis, the support structure disposed within the longitudinal cavity.

9. The assembly of claim 1 wherein the support structure is formed from a single unitary block of material.

10. The assembly of claim 2 further comprising sensing means on each support column, the sensing means providing an output signal proportional to forces along selected axes of the orthogonal axes.

11. The assembly of claim 1 wherein the torque cell comprises a flexure beam having sensing means mounted thereon, the sensing means providing an output signal proportional to the moment about the structure longitudinal axis.

12. The assembly of claim 11 wherein the torque cell is tubular.

13. The assembly of claim 11 wherein the torque cell comprises a twisting rod.

14. A structural assembly used to transmit and measure a plurality of forces and moments with respect to three orthogonal force axes comprising $F_X$, $F_Y$ and $F_Z$, and three orthogonal moment axes comprising $M_X$, $M_Y$ and $M_Z$, each moment axis being about the corresponding force axis, the assembly comprising:

a support structure having a first structure end and a second structure end defining a support structure longitudinal axis, the support structure oriented such that the support structure longitudinal axis is along the force axis $F_Z$, and having a plurality of support columns connecting the first structure end to the second structure end such that the plurality of support columns rigidly transmit forces and moments on the $F_X$, $F_Y$, $F_Z$, $M_X$ and $M_Y$ axes and are substantially compliant to moments on the $M_Z$ axis;

first measuring means on the support structure for measuring forces and moments on the $F_X$, $F_Y$, $F_Z$, $M_X$ and $M_Y$ axes;

a torque cell having a first torque cell end and a second torque cell end defining a torque cell longitudinal axis wherein the torque cell is concentrically positioned about the support structure such that the torque cell longitudinal axis is parallel to the support structure longitudinal axis;

second measuring means on the torque cell for measuring moments on the $M_Z$ axis; and flexure means comprising a first flexure diaphragm connecting the first structure end to the first torque cell end, and a second flexure diaphragm connecting the second structure end to the second torque cell end, each flexure diaphragm providing substantially rigid transmission for moments on the $M_Z$ axis from the support structure to the torque cell with substantially no force or moment transmissions on the $F_X$, $F_Y$, $F_Z$, $M_X$ and $M_Y$ axes.

15. The assembly of claim 14 wherein the plurality of support columns provide substantially no moment reaction on the $M_Z$ axis for small strains on the $M_X$ and $M_Y$ axes.

16. The assembly of claim 15 wherein the support structure includes a longitudinal cavity extending along the structure longitudinal axis, the torque cell disposed within the structure longitudinal cavity.

17. The assembly of claim 15 wherein the torque cell includes a longitudinal cavity extending along the torque cell longitudinal axis, the support structure disposed within the longitudinal cavity.

* * * * *